United States Patent
Sudou et al.

(10) Patent No.: US 7,966,106 B2
(45) Date of Patent: Jun. 21, 2011

(54) CONTROL DEVICE AND METHOD FOR GUIDED TRAVEL OF UNMANNED VEHICLE

(75) Inventors: Tsugio Sudou, Kanagawa (JP); Masanori Tojima, Kanagawa (JP); Koji Takeda, Kanagawa (JP); Akiharu Nishijima, Kanagawa (JP); Masaki Mori, Kanagawa (JP); Tomonori Ozaki, Kanagawa (JP); Kazunori Kuromoto, Kanagawa (JP)

(73) Assignee: Komatsu Ltd., Tokyo (JP)

( * ) Notice: Subject to any disclaimer, the term of this patent is extended or adjusted under 35 U.S.C. 154(b) by 1229 days.

(21) Appl. No.: 11/636,054

(22) Filed: Dec. 8, 2006

(65) Prior Publication Data

US 2007/0150133 A1   Jun. 28, 2007

(30) Foreign Application Priority Data

Dec. 9, 2005   (JP) ................................. 2005-356672

(51) Int. Cl.
*G01C 22/00*   (2006.01)
(52) U.S. Cl. ........................................... 701/23; 701/25
(58) Field of Classification Search ..................... 701/23, 701/25
See application file for complete search history.

(56) References Cited

U.S. PATENT DOCUMENTS

| | | | | |
|---|---|---|---|---|
| 5,239,249 A | * | 8/1993 | Ono | 318/587 |
| 5,387,853 A | * | 2/1995 | Ono | 318/587 |
| 6,059,063 A | * | 5/2000 | Shimizu et al. | 180/204 |
| 6,102,147 A | * | 8/2000 | Shimizu et al. | 180/204 |
| 6,226,572 B1 | * | 5/2001 | Tojima et al. | 701/23 |
| 6,292,725 B1 | * | 9/2001 | Kageyama et al. | 701/30 |
| 2007/0150133 A1 | * | 6/2007 | Sudou et al. | 701/23 |
| 2010/0076640 A1 | * | 3/2010 | Maekawa et al. | 701/26 |

FOREIGN PATENT DOCUMENTS

JP   2000-137522   5/2000

* cited by examiner

*Primary Examiner* — Khoi Tran
*Assistant Examiner* — Brian J Broadhead
(74) *Attorney, Agent, or Firm* — Husch Blackwell LLP

(57) ABSTRACT

Leveling operation can be effectively performed at a discharge site without increasing a cost of vehicles, and a running course can be easily generated in a short time and at a low-cost. Based on each of measured position data of a survey line 20 of a discharge site 21, a normal line Lc normal to the survey line 20 is obtained, a target discharge position 26' is positioned at a prescribed distance away from the survey line 20 in an inward direction of the discharge site 21 based on the normal line Lc, and then data of a running course 27 in which a reference approach direction 31 to approach the target discharge position 26' is a direction normal to the survey line 20 are generated.

10 Claims, 12 Drawing Sheets

CONTROL DEVICE AND METHOD FOR GUIDED TRAVEL OF UNMANNED VEHICLE

TECHNICAL FIELD

The present invention relates to a control device and a method for a guided travel of an unmanned vehicle, more particularly to a preferred device and a method for applying to a case where, in a discharge site in a mine and the like, a guided travel of an unmanned vehicle is performed to a target discharge position and earth and sand is unloaded.

BACKGROUND ART

In a large mine, a guided travel system for an unmanned vehicle in which the unmanned vehicle such as unmanned off-road dump trucks is guided and travels has been widely used in order to reduce painful works, decrease the production cost, and save the fuel.

The above-mentioned unmanned vehicle has a position measuring device that measures its running position using GPS (Global Positioning System) and the like. Additionally, a monitor station that monitors plural unmanned vehicles obtains, by surveying a work site or teaching, position data on a running course through which the unmanned vehicle is to run, and stores the position data. After receiving the position data of the running course from the monitor station via a radio communication and the like, the unmanned vehicle measures its current position (and its direction) using a position measuring device that the vehicle has, compares the measured current position at the time of traveling with the running course in a sequence, and is steered and controlled so as to sequentially reach each position on the running course.

Here, as a method for obtaining the position data of the running course, for example, a teaching method in which a teaching vehicle actually travels and memorizes the travel path has been widely used.

In this case, the teaching vehicle actually runs so as to pass through target points where the unmanned vehicle has to reach. Then, the position data regarding a path from a running start point to a target point or a path from the running start point through the target point to a running end point is obtained. There is another method that only the position data of the target point is obtained by teaching, and the running course is generated through the obtained position data of the target point.

Japanese Patent Application Laid-open No. 2000-137522 discloses the following related arts 1 and 2.

(Related Art 1)

As shown in FIG. 1, at a discharge site 21 in a mine, a discharging work is performed such that an unmanned vehicle 13 carries earth and sand, and discharges it. In this case, a teaching vehicle travels along a running course 27 to a target discharging position 26' located near a survey line 20 that functions as a boundary line of the discharge site 21, whereby the position data of the running course 27 is obtained. As a result, the unmanned vehicle 13 can discharge the earth and sand outside the survey line 20 (to cliff) in the discharge site 21 after traveling along the taught running course 27.

(Related Art 2)

Since a discharge site 21 of a large scale mine or the like is wide, the number of target discharge positions 26' in the vicinity of a survey line 20 reaches several hundreds points along the survey line 20. Thus, to obtain position data of running courses 27 for each of the large number of target discharge positions 26' by the teaching work as mentioned in the related art 1, the number of the teaching works using teaching vehicles becomes increase, requiring much more time and man-hour to generate running courses.

And, as shown in FIG. 2, the teaching vehicle 40 is traveled along the survey line 20 in the discharge site 21, position data of plural target discharge positions 26' in the discharge site 21 are generated based on the obtained position data of the survey line 20, and running courses 27 to reach each of the target discharge position are acquired through calculation process.

In a case where the related art 1 is employed, works at mines are performed as follows.

Specifically, for example, stripped earth and sand by a stripping work is loaded to an unmanned vehicle 13. The unmanned vehicle 13 travels, by guiding, to the target discharge position 26' in the vicinity of the survey line 20 in the discharge site 21. At the target discharge position 26', a carrier (body) performs a dumping operation toward a precipice, thereby falling off the earth and sand loaded on the carrier. The earth and sand, which does not fall off to the precipice and remains on the discharge site, in other words, pile 26c, is pushed out by a bulldozer or other leveling vehicles, and the discharge site 21 is leveled. A discharge work such that a dump truck 13 discharges and falls off earth and sand from a high position to a precipice is called as a high-dump work.

On the other hand, in a case where the related art 2 is employed, works at mines are performed as follows.

Specifically, in a similar way to the above-mentioned case, stripped earth and sand by a stripping work is loaded to an unmanned vehicle 13. The guided travel of the unmanned vehicle 13 is performed to the target discharge position 26' in the discharge site 21. At the target discharge position 26', the carrier performs the dumping operation, and the earth and sand loaded on the carrier is unloaded. As a result, the earth and sand is piled on the discharge site as a highly piled up pile 26c without falling off to the precipice. The bulldozer pushes out the highly piled up pile 26c, and the discharge site 21 is leveled. The discharge work such that a dump truck 13 discharges the earth and sand within the discharge site 21 is called as a paddock discharge work.

Recently, the unmanned dump track has become larger, and the earth and sand loaded on the carrier (body) reaches 300 ton or heavier.

According to the related art 1, since the earth and sand is discharged by the high-dump work, in most cases, almost all the earth and sand is fallen off to the precipice, and relatively little earth and sand remains in the discharge site 21. Consequently, as is often the case, leveling work by the bulldozer 16 is performed with relatively high operation efficiency.

However, according to the related art 2, since the earth and sand is discharged by the paddock discharge work, all the discharge earth and sand with more than 300 ton becomes the pile 26c in the discharge site 21. Therefore, it is difficult or may be impossible for an ordinary bulldozer 16 to push out the pile 26c. And even if the bulldoze 16 can push out the pile 26c, such piles 26c are piled up at plural target discharge positions 26' in the discharge site one after another. And, the amount of discharge work may exceed the capability of leveling work, resulting in decreased work efficiency. Furthermore, to enhance the capability of leveling work, it is necessary to use a larger bulldozer 16, strengthen the pulling power, or increase the number of the bulldozers 16, which may lead to increase in cost of the vehicles.

For this reason, considering only efficiency or cost of the leveling work, it is desirable to employ the related art 1 in which leveling work can be efficiently performed by a bulldozer with ordinary power. As mentioned above, the related art 1, however, requires time or cost for the teaching work on a running course, thus there remains a problem that time or cost required for generating the running course increases.

SUMMARY

The present invention has been made in view of the above circumstances and has an object to overcome the above problems and to provide a guided running control device and a method for an unmanned vehicle that can efficiently performs the leveling work at the discharge site without increasing the cost of the vehicle, and easily generate the running course in a short time and low-cost.

A first aspect of the present invention provides a control device for a guided travel of an unmanned vehicle, in which the unmanned vehicle is guided to travel along a running course so as to approach in a desired direction to a target discharge position as a target position where the unmanned vehicle performs a discharge operation at a discharge site, and to perform the discharge operation to discharge a load on the unmanned vehicle at the target discharge position, the control device comprising: survey line position measuring means for measuring each position of a survey line showing a boundary line of the discharge site; running course generation means for, after obtaining a line normal to the survey line based on each of the measured position data of the survey line in the discharge site, generating data of a running course, based on the normal line, in which the target discharge position is positioned at a prescribed distance away from the survey line and a direction of approaching the target discharge position is normal to the survey line; control means for guiding the vehicle to travel along the generated running course to the target discharge position, and operating the vehicle so as to discharge the load on the unmanned vehicle at the target discharge position after the unmanned vehicle reaches the target discharge position.

A second aspect of the present invention provides the control device according to the first aspect of the present invention, wherein the running course generation means; obtains each segment point on the survey line based on the measured position data on the survey line, obtains a line normal to each of the segment points, obtains a point on the normal line at a prescribed distance away from the segment point in an inward direction of the discharge site, obtains a line of which a line shape is corrected by applying a smoothing process to a line that is acquired by connecting each of the obtained points on each of the normal lines, and by setting to the target discharge position a position on a line normal to the line to which this smoothing process is applied, generates the data of the running course in which the direction of this normal line is a direction to approach the target discharge position.

A third aspect of the present invention provides the control device according to the first aspect of the present invention, wherein the running course generation means; obtains a line that a line shape is corrected by applying a smoothing process to a line that is acquired by connecting each of the measured positions on the survey line, obtains a line normal to the corrected line, sets to the target discharge position a position on the normal line, and generates the data of the running course in which a direction of the normal line is a direction to approach the target discharge position.

A fourth aspect of the present invention provides the control device according to the first aspect of the present invention, wherein a mound is formed along the survey line in the discharge site, the unmanned vehicle is provided with a sensor for detecting that a wheel of the unmanned vehicle reaches the mound formed along the survey line, and when the sensor detect that the wheel of the unmanned vehicle reaches the mound formed along the survey line before the wheel reaches the target discharge position, the unmanned vehicle is operated so as to discharge the load on the unmanned vehicle at the position that the sensor detects.

A fifth aspect of the present invention provides the control device according to the fourth aspect of the present invention, wherein the sensor detects a reduction of a speed or a travel distance of the unmanned vehicle, and when the reduction of the speed or the travel distance of the unmanned vehicle is detected by the sensor before a speed reduction instruction to stop the unmanned vehicle at the target discharge position is output, it is determined that the wheel of the unmanned vehicle reaches the mound formed along the survey line, and the unmanned vehicle is operated so as to discharge the load on the unmanned vehicle at the position that the sensor detects.

According to the first aspect of the present invention, as shown in FIGS. 11A and 11B, a line Lc normal to a survey line 20 is obtained based on each measured position data on the survey line 20 in a discharge site 21. A target discharge position 26' is set to a position located prescribed distance from the survey line 20 on the normal line Lc in an inward of the discharge site 21 is. Then, data regarding a running course 27 in which a reference approach direction 31 for approaching the target discharge position 26' is normal to the survey line 20 are generated.

The second aspect of the present invention includes a restriction on generating means of the running course of the first aspect of the present invention. As shown in FIGS. 10A through 10C, each of segment points P1, P2, ... is obtained on the survey line 20 on the basis of each of the measured position data on the survey line 20. Lines La1, La2, ... normal to each the segment points P1, P2, ... are obtained. Points Q1, Q2, ... located prescribed distance d from each of the segment points P1, P2, ... on the normal lines La1, La2, ... in an inward of the discharge site 21 are obtained for each of the normal lines La1, La2, .... By applying a smoothing process to a line Lb in which each of the points Q1, Q2, ... on each of the normal lines La1, La2, ... are connected, a line Lb' of which a line shape is smoothed is obtained. Then, as shown FIGS. 11A and 11B, a position 26 on the normal line Lc normal to the line Lb' to which the smoothing process is applied is the discharge position 26. And then, data regarding a running course 27 in which a direction 31 of such normal line Lc is the direction 31 for approaching the discharge position 26 are generated.

The third aspect of the present invention includes a restriction on generating means of the running course of the first aspect of the present invention. As shown in FIGS. 12 and 11B, by applying the smoothing process to a line Ld in which each of the measured positions on the survey line 20 are connected, a line Ld' of which a line shape is smoothed is obtained. A line Lc' normal to the smoothed line Ld' is obtained, and the discharge position 26 is located on the normal line Lc'. Then, data regarding a running course 27 in which a direction 31 of such normal line Lc' is the direction 31 for approaching the discharge position 26 are generated.

The fourth aspect of the present invention further includes, in addition to the first aspect of the present invention, a mound detection section (sensor) 30, and control for running by the mound detection section (sensor) 30, as shown in FIGS. 4 and 5. As shown in FIG. 8, a vehicle 13 is provided with the mound detection section (sensor) 30 for detecting that a rear wheel 13d of the unmanned vehicle 13 reaches a mound 20C. When the sensor 30 detects that the rear wheel 13d of the vehicle 13 reaches a mound 20C' formed along the survey line 20 before the vehicle 13 reaches the target discharge position 26', the unmanned vehicle 13 is operated so as to discharge the earth and sand loaded on the unmanned vehicle 13 at the position detected by the sensor.

The fifth aspect of the present invention includes a further restriction on the fourth aspect of the present invention. The mound detection section (sensor) 30 comprises a sensor that detects a reduction in speed and travel distance of the vehicle 13. When the sensor 30 detects that the speed or travel distance of the unmanned vehicle 13 reduces before an instruction to slow down to stop the unmanned vehicle 13 is given, it is determined that the rear wheel 13d of the unmanned vehicle 13 reaches the mount 20C formed along the survey line 20, and the unmanned vehicle 13 is operated so as to discharge the earth and sand loaded on the unmanned vehicle 13 at the position detected by the sensor.

According to the present invention, by automatic calculation process based on the data regarding each position on the survey line 20 measured through teaching, surveying and the like, plural target discharge positions 26' are obtained in the vicinity of and along the survey line 20, and the reference approach directions 31 normal to the survey line 20 are determined. Based on the calculation result, running courses 27 to approach each of the target discharge position 26' in each of the reference approach directions 31 are automatically generated, and each vehicles 13 is guided to travel along each of the generated running courses 27 and discharge at each of the target discharge positions 26'. Thus, it is possible that the vehicle 13 approaches in the vicinity of the survey line with the reference discharge position 31, whereby discharging can be performed in the most efficient manner, and that the vehicle 13 discharges the earth and sand outside the survey line 20 (or in the vicinity of the survey line 20) using the high-dump work in a secure and correct manner. As a result, almost all of the earth and sand can be discharged down to the precipice outside the survey line 20, the earth and sand that remains in the discharge site 21 can be reduced as minimum as possible. Consequently, leveling work can be efficiently performed by ordinary bulldozers 16, and the cost of efficient leveling work, vehicles and the like can be dramatically reduced.

Additionally, unlike the related arts, when generating the plural running courses 27, it is not necessary to differently teach the running courses 27 to each of the target positions (discharge positions). Each of the running courses 27 is automatically generated after measuring each of the positions along the survey line 20 in the discharge range 20L. Therefore, time and cost for carrying work by the vehicle 13, preparation work (teaching or surveying) performed before the leveling work by the vehicle 16 can be reduced.

As mentioned above, according to an aspect of the present invention, leveling work at the discharge site 21 can be efficiently performed without raising the cost of vehicles, and the running courses 27 can be easily generated in a short time and at low cost.

Additionally, according to the fourth and fifth aspect of the present invention, the earth and sand can be discharged outside the survey line 20 in a safety and secure manner without derail and the like of vehicle 13. Thus, it is possible to safely perform the guided travel of the vehicle 13, and operate the discharge work safely.

DETAILED DESCRIPTION

Hereinbelow, an exemplary embodiment of a control device for a guided travel of a vehicle according to the present invention will be described in detail with reference to the attached drawings.

Figure 1:
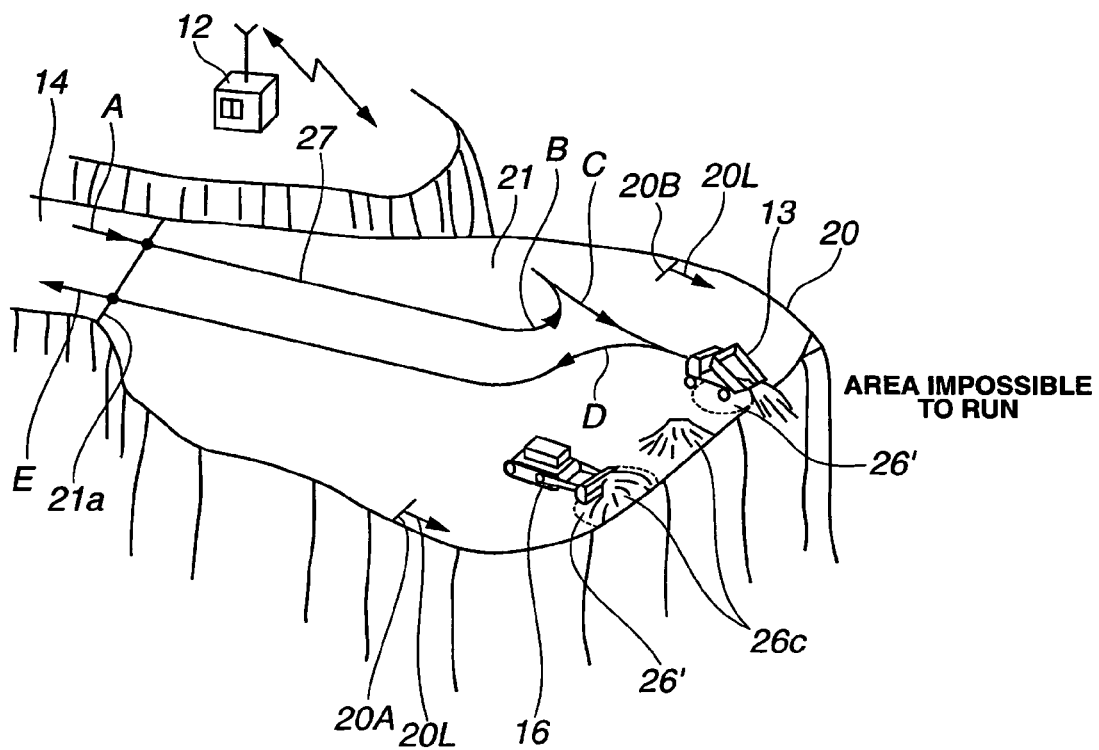
FIG. 1 is a diagram showing a discharge site.
Figure 2:
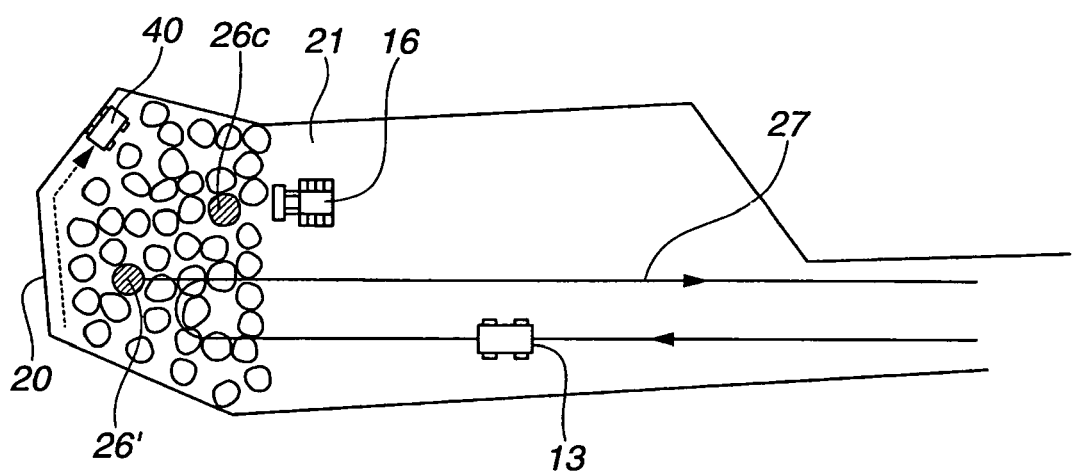
FIG. 2 is a diagram describing a prior art.

FIG. 1 shows an appearance of a work site of the exemplary embodiment. In this exemplary embodiment, a case is assumed where the guided travel of the unmanned vehicle 13 such as an off-road dump truck, which loads earth and sand, is performed along a running course 27 to a target discharge position 26' in a discharge site 21 in a large scale mine site, and the earth and sand is discharged at the target discharge position 26'.

Figure 3:
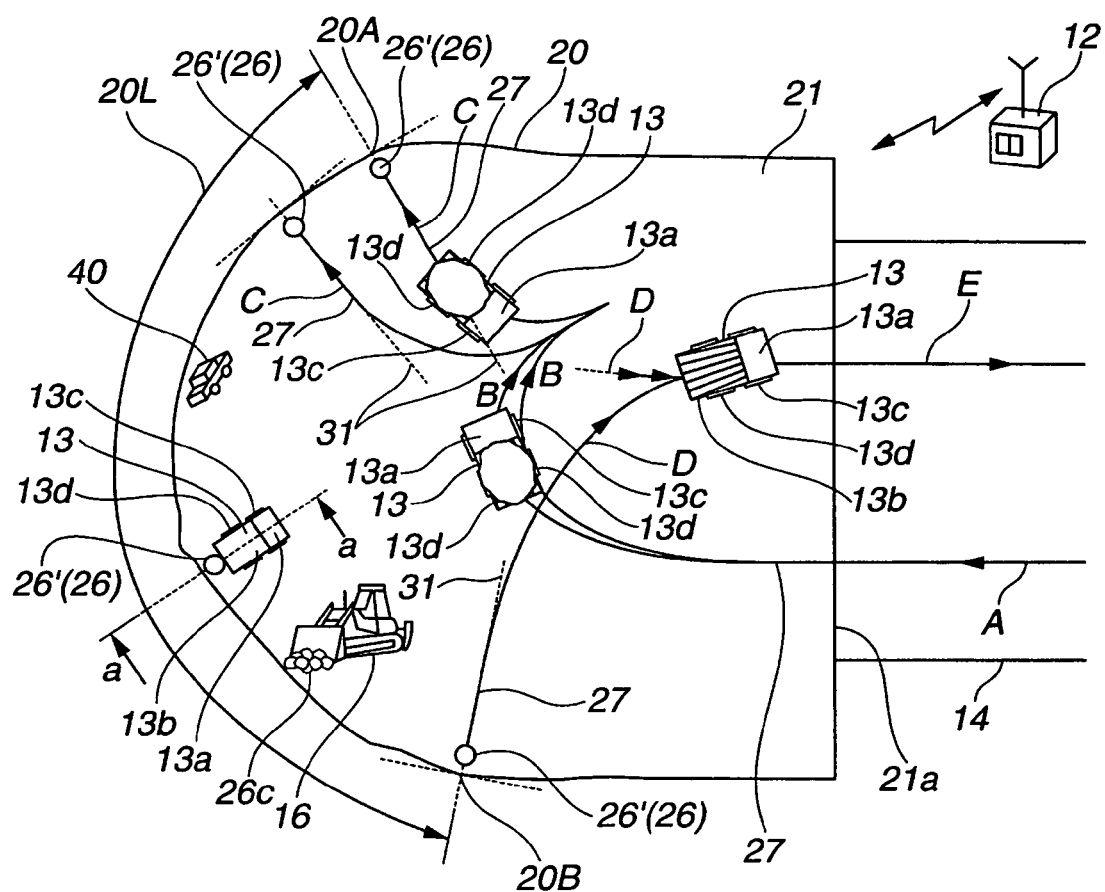
FIG. 3 is a conceptual diagram showing a shape of a discharge site and generated running courses.

FIG. 3 is a conceptual diagram of the discharge site 21 viewing from above.

In this exemplary embodiment, a case is assumed where a discharge range 20L (end points: 20A, 20B) is determined from a survey line 20 that is a boundary line of the discharge site 21, a guided travel of vehicles 13 is performed along running courses 27 to each of the target discharge position 26' in the discharge range 20L, the vehicles 13 performs dumping operations at each of the target discharge positions 26', and the earth and sand is discharged outside or in the vicinity of the survey line 20.

Hereinbelow, a description will be made using an unmanned off-road dump truck 13 as an example of the vehicle. The vehicle 13 is a front wheel driving vehicle having a driver's cabin (cab) 13a at a front portion thereon, a rear deck (vessel, body) at a rear portion thereon, and front wheels 13c and rear wheels 13d. The vehicle 13 approaches the target discharge position 26' in a state of reverse traveling, in other words, in the state that the rear wheels 13d are positioned to a front portion against a traveling direction, in a reference approach direction 31 (reference discharge position) described later, in other words, in the approach direction 31 normal to the survey line 20.

Figure 4:
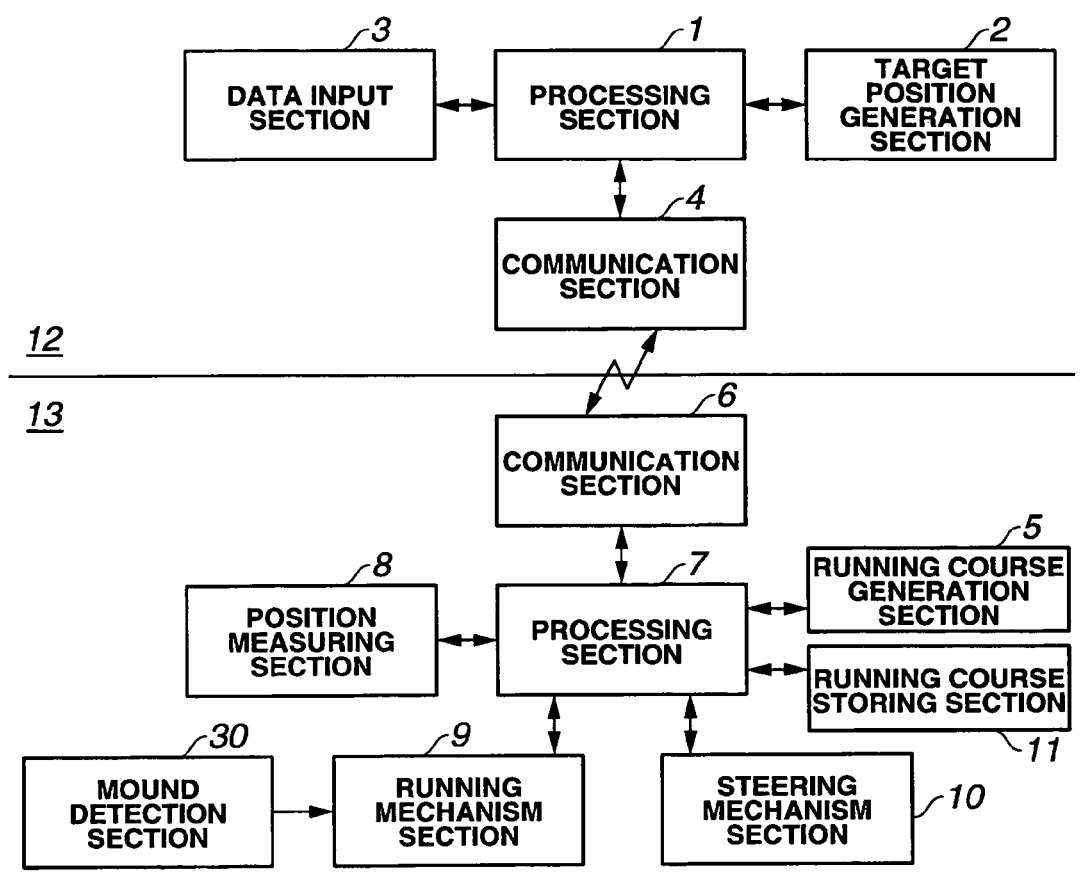
FIG. 4 is a block diagram showing a configuration of an unmanned vehicle guided travel system of an exemplary embodiment.

FIG. 4 shows a block diagram of an exemplary embodiment of a vehicle monitoring system.

In a work site, a monitor station 12 for managing and monitoring a number of vehicles 13 is provided. The monitor station 12 has a processing section 1, a target position generation section 2, a data input section 3, and a communication section 4. The vehicle 13 has a running course generation section 5, a communication section 6, processing section 7, a position measuring section 8, a running mechanism section 9, a steering mechanism section 10, a running course storing section 11, and a mound detection section 30.

The position measuring section 8 of the vehicle 13 measures a current position of the vehicle. As means for measuring the position, for example, a tire revolution number sensor and a gyroscope provided to the vehicle 13 are used. Then, the position of the vehicle is measured based on output signals from the tire revolution number sensor and the gyroscope. Additionally, the position of the vehicle may be measure by GPS.

The position data measured by the vehicle 13 is processed by the processing section 7, and is sent to the monitor station 12 via the communication section 6.

The communication section 4 in the monitor station 12 receives the position data sent by plural vehicles 13. The processing section 1 generates instruction data that include instructions of the starting, the stopping, and the like, for the vehicle 13 based on positional relationships between each of the plural vehicles 13, and the communication section 4 sends those instruction data to the vehicle 13.

The communication section 6 in the vehicle receives the instruction data sent by the monitor station 12.

And the processing section 7 in the vehicle 13 generates a running instruction and a steering instruction to travel and steer the vehicle in accordance with the received instruction data. The running instruction and the steering instruction are output to a running mechanism section 9 and a steering mechanism, respectively. As a result, the vehicle 13 travels and steers in accordance with the instruction data sent by the monitor station 12.

To the data input section 3 in the monitor station 12, topography data of the discharge site 21 obtained by teaching or surveying are input. While a discharge range 20L is determined in the survey line, each position data on the survey line 20 in the discharge site 21 are input. Vehicle data of the vehicle 13 are also input.

The data that is input into the data input section 3 in the monitor station 12 are processed by the processing section 1. The target position generation section 2 generates positional data regarding plural discharge positions 26 along the survey line 20, and data regarding the reference approach directions 31 (reference discharge position) to approach each of the discharge positions 26.

While selecting a next discharge position 26 from plural discharge positions 26 generated by the target position generation section 2, the processing section 1 selects a next vehicle 13 that travels to the next discharge position 26. Through the communication section 4, a position of the selected discharge position 26 and reference approach direction data are sent to the selected vehicle 13.

The communication section 6 of the vehicle receives the data of a position of the discharge position 26 and the reference approach direction sent from the monitor station 12.

The received data of the position of the discharge position 26 and the reference approach direction are processed in the processing section 7, and the running course generation section 5 generates a running course 27 to approach the discharge position 26, which is regarded as a target discharge position 26', in the reference approach direction 31 corresponding to the target discharge position 26'. The position data of the generated running course 27 are stored in the running course storing section 11.

The processing section 7 generates the running instruction and the steering instruction in which the vehicle 13 follows each of the positions on the running course 27 by comparing the current vehicle position measured by the position measuring section 8 with each of the positions on the running course 27 stored in the running course storing section 11. The running and the steering instructions are output to the running mechanism section 9 and the steering mechanism section 10, respectively. Consequently, the vehicle 13 is guided to travel along the running course 27, and reaches the target discharge position 26' in the reference approach direction 31.

Figure 8:
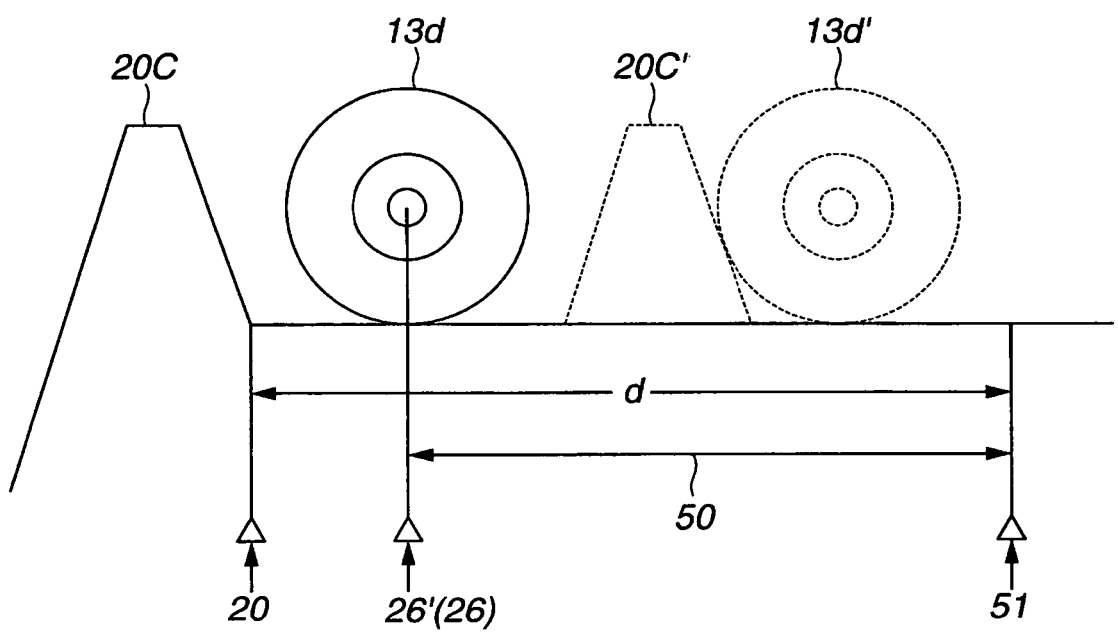
FIG. 8 is a vertical sectional view in the vicinity of a survey line.

FIG. 8 is a sectional view taken along the line a-a of FIG. 3, in other words, a vertical sectional view take along the survey line 20, showing an appearance that the vehicle 13 approaches the target discharge position 26' in a reverse travel.

A mound 20C is formed along the survey line 20 in the discharge site 21. This mound 20C is higher than the ground level of the discharge site 21.

The vehicle 13 has the mound detection section (sensor) 30 (FIG. 4) for detecting that the rear wheel 13d of the vehicle 13 reaches the mound 20C. Specifically, the mound detection section 30 comprises a sensor for detecting the reduction of the speed or the travel distance of the vehicle 13. When the rear wheel 13d reaches the mound 20C, a load is activated to the rear wheel 13d and the speed is reduced. Hereinbelow, a description will be made by referring to a center position (contact point) of the rear wheel 13d of the vehicle 13 as the position of the vehicle 13. In the exemplary embodiment, the travel of the vehicle 13 is controlled such that the center position of the rear wheel of the vehicle 13 stops at the target discharge position 26'.

Figure 5:
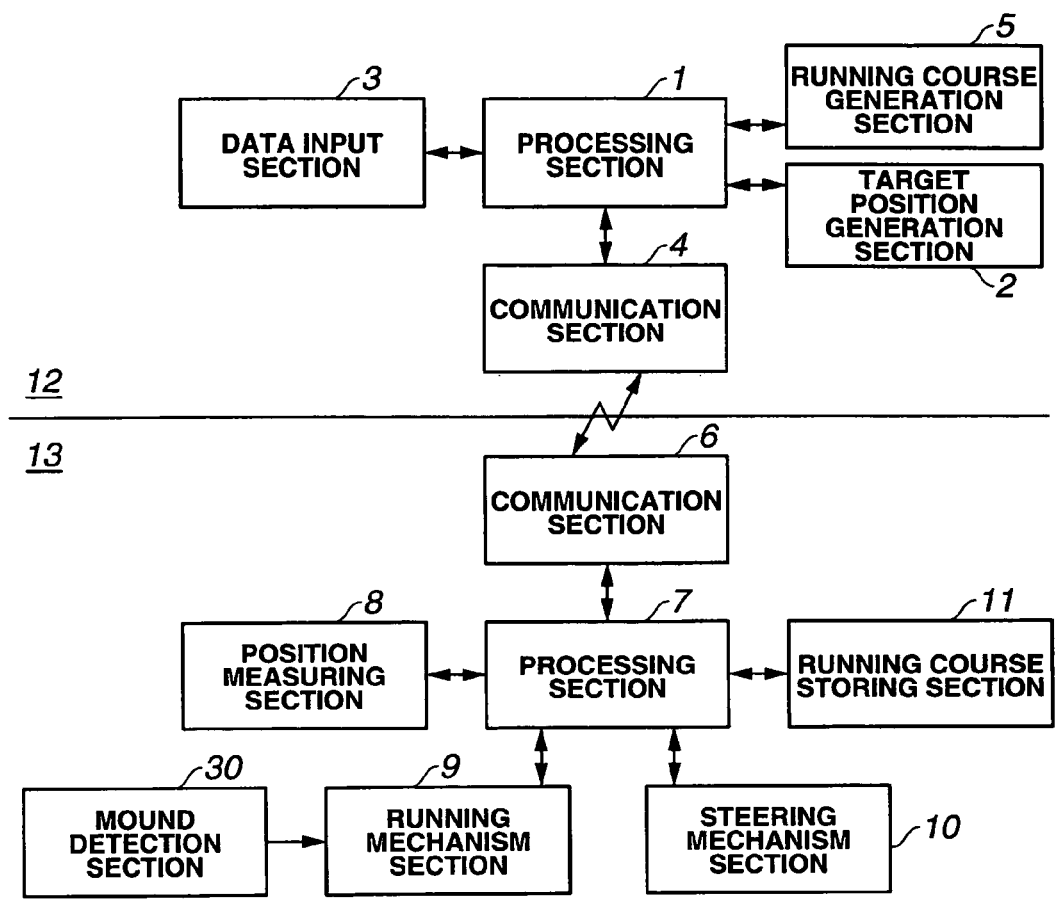
FIG. 5 is a block diagram showing a configuration of an unmanned vehicle guided travel system of an exemplary embodiment.

In a configuration in FIG. 4, although the running course generation section 5 is provided in the vehicle 13, the running course generation sections, as shown in FIG. 5, may be provided to the monitor station 12.

In a configuration in FIG. 5, the discharge positions 26 along the survey line 20 in the discharge site 21 and the reference approach direction data are generated by the target generation section 2 in the monitor station 12. The running course generation section 5 generates each of the running courses 27 to approach each of the target discharge positions 26' for each of the discharge positions 26 in each of the reference approach directions 31. While selecting the next running course 27 to be traveled from each of the running courses generated by the running course generation section 5, the processing section 1 selects the next vehicle 13 to travel. Through the communication section 4, the position data of the selected running course 27 are sent to the selected vehicle 13.

The communication section 6 in the vehicle 13 receives the position data of the selected running course 27 sent by the monitor station 12. The received position data of the running course 27 are stored in the running course storing section 11.

Next, with reference to the flow chart shown in FIG. 9, the generation procedures of the discharge position 26 and the reference approach direction 31 at the discharge position 26 that are generated in the target position generation section 2 in FIGS. 4 and 5, and the generation procedure of the running course generated in the running course generation section 5 will be described. In the flow chart shown in FIG. 9, the description will be made based on the premise of the configuration shown in FIG. 5. In other words, a case is assumed where, while the monitor station 12 generates the discharge position 26 and the reference approach direction 31, the running course 27 is generated.

First, a path of the running course 27 will be described.

As shown in FIGS. 1 and 3, the discharge site 21 is a region surrounded by the survey line 20. In the discharge site 21, an entrance 21a for the vehicle 13 is provided. The entrance 21a is placed between a common running course region 14 and the discharge site 21.

A discharge range 20L is a range in the survey line 20 where the discharge is operated. In the discharge range 20L, plural discharge positions 26 are placed in regular intervals along the survey line 20. The intervals of the discharge position 26 are set at distances where leveling operation can be easily performed by a bulldozer 16. The reason that plural discharge positions 26 are placed at regular intervals along the survey line 20 is to prevent the collapse of the edge of the ground and to easily form the mound 20C (FIG. 8) along the survey line 20 by evenly piling the earth and sand in regular intervals along the survey line 20. The reason for determining the discharge range 20L is because the whole survey line is not necessarily dischargeable region, for example, there exists a sheer cliff like a wall in a part of the survey line. The efficiency of the leveling operation using the bulldozer 16 can be improved by setting the survey line to have plural discharge ranges.

The vehicle 13 starts to travel from the travel starting point, travels in a direction of arrow A on the common running course region 14, and reaches the entrance 21a of the discharge site 21. Passing through the entrance 21a, the vehicle 13 enters into the discharge site 21. Then, the vehicle 13 performs a switchback movement in the discharge site 21. In other words, after advancing toward the arrow B direction, the vehicle 13 travels backward in a direction of arrow C, in principle, along the reference discharge direction 13. Then, the vehicle stops at the target discharge position 26' and the earth and sand is discharged. In other words, a rear deck (vessel, body) 13b of the dump truck 13 is tilted and the earth and sand on the rear deck 13b is discharged at the target discharge position 26'. After completing the discharge operation, the vehicle 13 advances toward the arrow D, leaves the discharge site 21 from the entrance 21a, and enters into the common running course region 14. Then, the vehicle 13 travels in a direction of arrow E on the common running course region 14, and reaches the travel ending point.

Here, while the discharge site 21 (area inside of and surrounded by the survey line 20) and the common running course region 14 are an area possible to run where the vehicle 13 can run, an area outside of the area possible to run is an area impossible to run where the vehicle 13 cannot run. For example, the outside of the survey line 20 of the discharge site 21 is an area where the vehicle 13 cannot run because of its topographical reasons such as existence of a cliff and wall.

Figure 9:
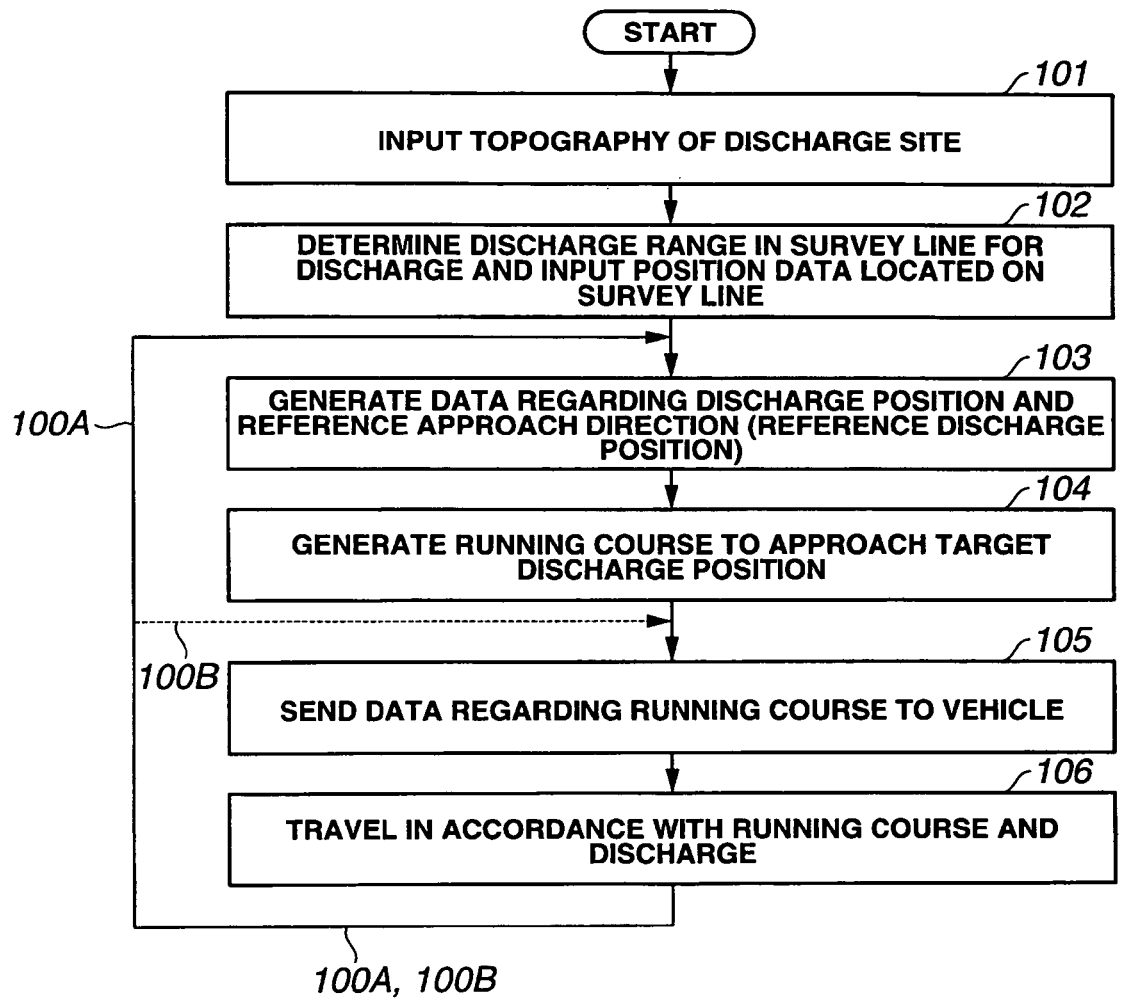
FIG. 9 is a flow chart of the exemplary embodiment.

Here, in step 101 of FIG. 9, the topographical data of the discharge site 21, in other words, the data that show positions and shapes of the discharge site 21 such as each positional data of the entrance 21a of the discharge site 21 are input through the data input section 3 having keyboards and the like (step 101).

Next, in the survey line 20 of the discharge site 21, positional data that show each position located on the survey line 20 are input after positions of each of the end points 20A, 20B of the discharge range 20L are designated (step 102).

Each of the positional data on the survey line 20, and the end points 20A, 20B of the discharge range 20L are obtained through survey. Or these data may be obtained through teaching.

Figure 6:
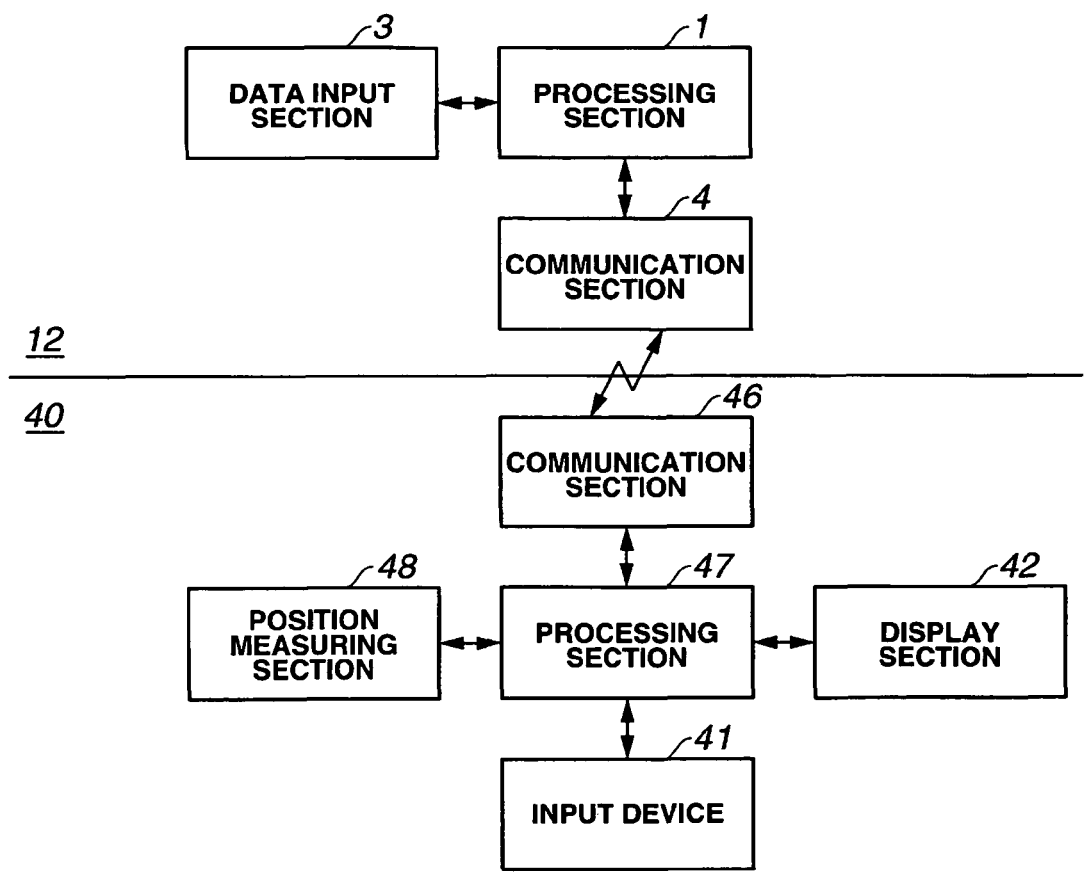
FIG. 6 is a block diagram showing a configuration of an unmanned vehicle guided travel system of an exemplary embodiment.

FIG. 6 shows a configuration of designating the discharge range 20L by a manned vehicle (vehicle for teaching) 40, and sending the designated data to the monitor station 12.

A position measuring section 48 in the manned vehicle 40 measures the positions of the manned vehicle 40. As shown in FIG. 3, a display screen of the display section 42 shows the position, the shape and the appearance that the manned vehicle 40 travels in the discharge site 21. The topographical data of the discharge site 21 that are input, in step 101, into the monitor station 21 are sent to the manned vehicle 40. The manned vehicle 40 generates the position and the shape of the discharge site 21 based on the sent topographical data. And then, the display screen of the display section 42 displays the position and the shape of the discharge site 21.

An operator of the manned vehicle 40 actually travels the vehicle 40 to reach the end point 20A that is one end of the discharge range 20L for discharging the earth and sand. After confirming on the display screen of the display section 42 that the vehicle 40 reaches the desired end point 20A, the operator operates the input section 41 to input a command of "end point". As a result, at a time of the input, the position measured by the position measuring section 48 is designated as position data that show the end point 20A, and the positional data showing this end point 20A is stored in the processing section 47. Additionally, the operator of the vehicle 40 travels the vehicle 40, along the survey line 20, to the end point 20B that is other end of the discharge range 20L. Through this operation, the data showing each position on the survey line 20 one by one are measured by the position measuring section 48, and stored in the processing section 47. When the vehicle 40 reaches the end point 20B that is the other end point of the discharge range 20L for discharging the earth and sand, the operator operates the input section 41 to input a command of "end point" after confirming that the vehicle 40 reaches the desired end point 20B. As a result, at a time of input, the position measured by the position measuring section 48 is designated as the positional data showing the end point 20B, and the positional data showing this end point 20B are stored in the processing section 47.

The data that are stored in the processing section 47 and show each of the positions on the survey line 20 (data showing each of the positions on the discharge range 20L) are sent from the communication section 46 to the communication section 4 in the monitor station 12. The above-mentioned positional data are received by the communication section 4 of the monitor station 12, and stored in the processing section 1.

Figure 7:
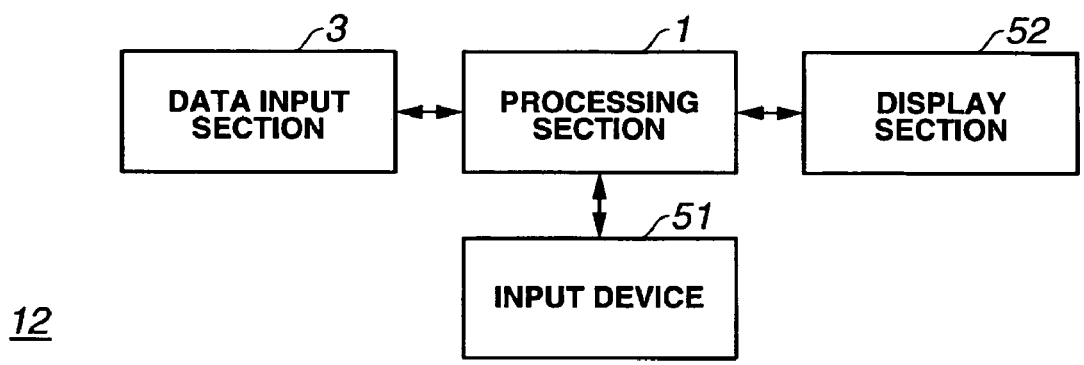
FIG. 7 is a block diagram showing a configuration of an unmanned vehicle guided travel system of an exemplary embodiment.

FIG. 7 shows a configuration in a case when the data showing each of the positions on the survey line 20 (data showing each of the positions on the discharge range 20L) are obtained by the monitor station 12.

In this case, the survey is conducted in advance, and the data showing each of the positions on the survey line 20 are obtained. Each of the positional data on the survey line 20 that is obtained through surveying is input to the data input section 3 in the monitor station 12. On a display screen of the display section 52, positions and shapes of the survey line 20 in the discharge site 21 is displayed based on the topographical data of the discharge site that are input in step 101 and each of the positional data obtained through surveying. An operator in the monitor station performs input operation on the display screen of the display section 52 to designate the end points 20A, 20B of the discharge range 20L for discharging the earth and sand. Through this operation, the positional data showing each of the positions on the discharge range 20L are stored in the processing section 1.

Next, discharge positions 26 and reference approach direction 31 (reference discharge position) at each of the discharge positions 26 are calculated based on the data showing each of the positions on the survey line 20 (data showing each of the positions on the discharge range 20L) obtained as mentioned above.

FIGS. 10 and 11 show diagrams describing a calculation process for obtaining the discharge positions 26 and the reference approach direction 31 (reference discharge position) at each of the discharge positions 26. This calculation process is carried out in the target position generation section 2.

Figure 10A:
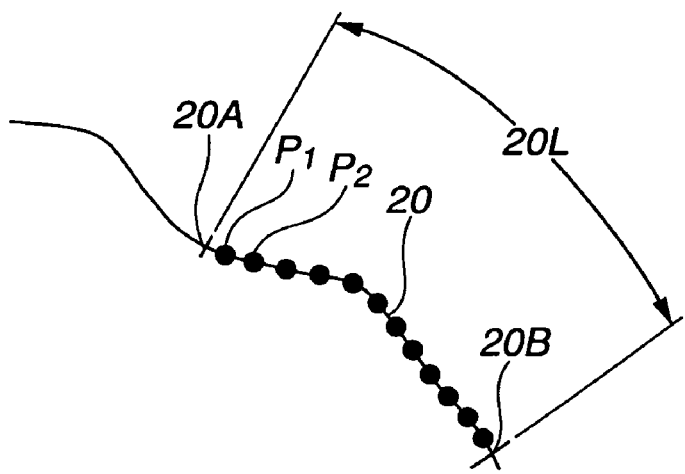
FIGS. 10A through 10C are diagrams describing a generation method of discharge positions and reference approach directions.
Figure 10B:
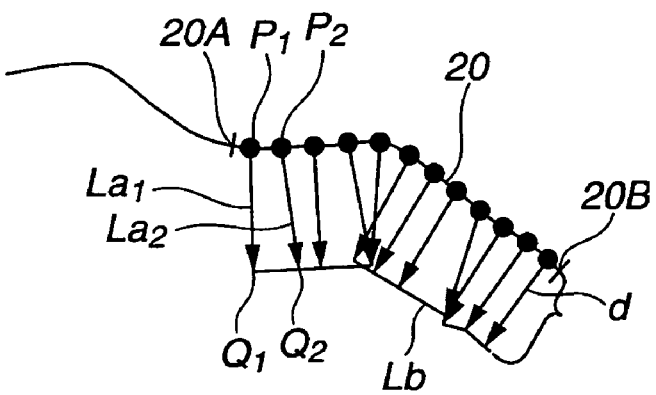
Figure 10C:
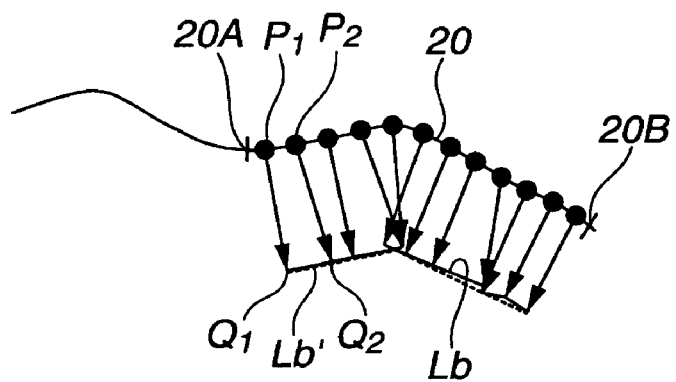
Figure 11A:
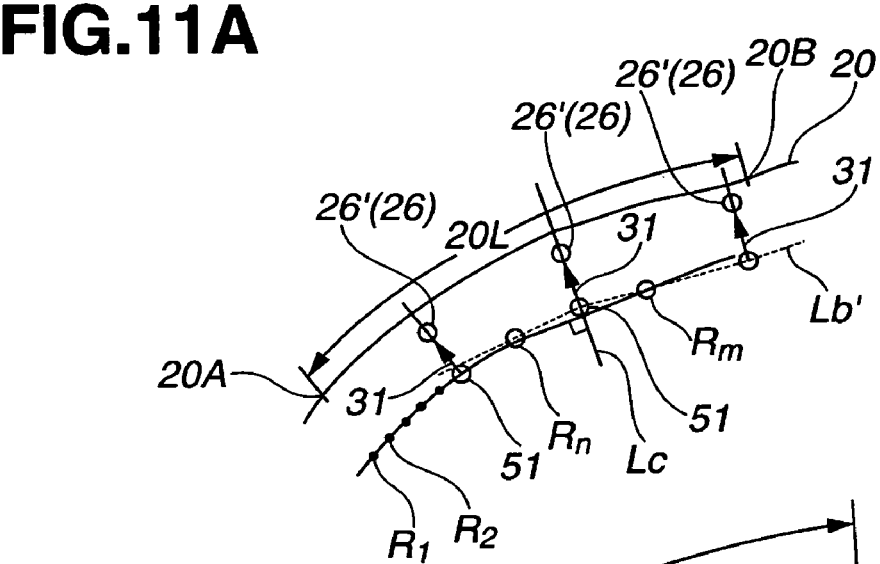
FIGS. 11A to 11B are diagrams describing the generation method of the discharge positions and the reference approach direction, and a generation method of a running course.
Figure 11B:
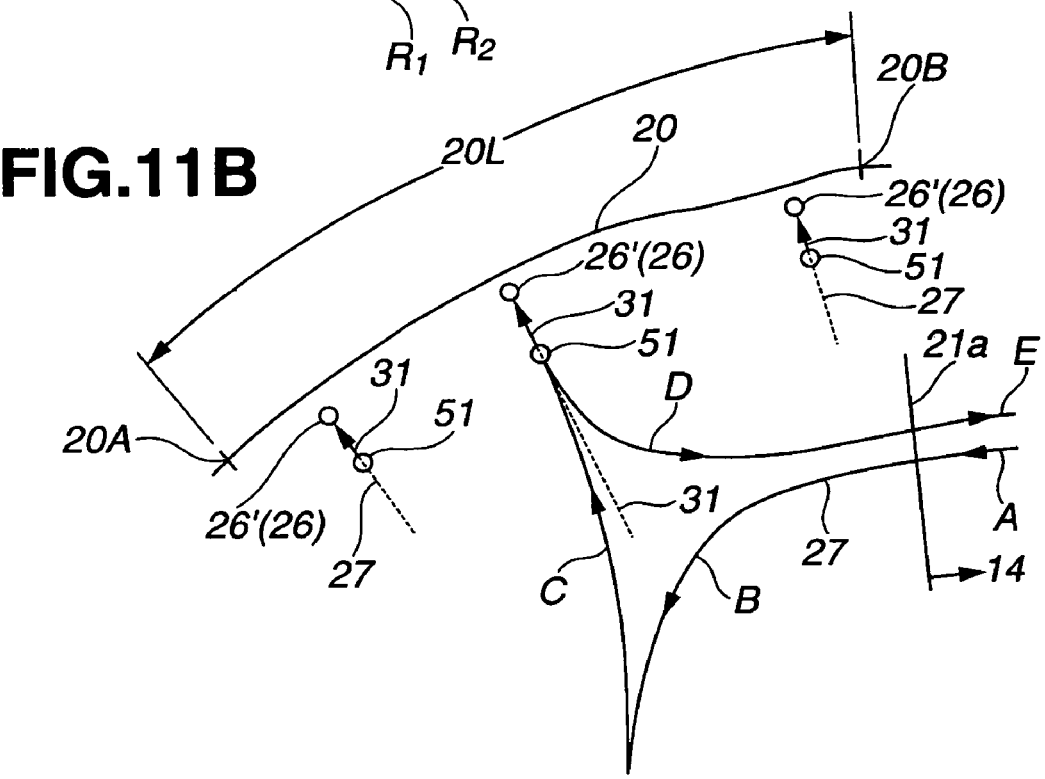

In this exemplary embodiment, each segment point P1, P2, . . . is obtained on the survey line 20 on the basis of each of the measured position data on the survey line 20. Lines La1, La2, . . . normal to the survey line 20 at each of the segment points P1, P2, . . . are obtained. Points Q1, Q2, . . . located in a prescribed distance d from each of the segment points P1, P2, . . . on each of the normal lines La1, La2, . . . in an inward of the discharge site 21 are obtained for each of the normal lines La1, La2 . . . . By applying a smoothing process to a line Lb that is obtained by connecting each of the points Q1, Q2, . . . on each of the normal lines La1, La2, . . . , a line Lb' of which a line shape is smoothed is obtained (FIGS. 10A, 10B and 10C). Then, a position 26 on the normal line Lc normal to the line Lb' to which the smoothing process is applied is the discharge position 26, and a direction 31 along the normal line Lc is set to a direction 31 to approach the discharge position 26 (FIGS. 11A and 11B). Hereinbelow, the calculation process will be described in order.

In the exemplary embodiment, as shown in FIG. 8, a start point 51 of a dischargeable section 50 is set at a position that is located in a prescribed distance d away from the survey line 20 in an inward of the discharge site 21. The discharge position 26 is set at a position that is located a prescribed distance away from the start point 51 of the dischargeable section 50 in an inward of the survey line 20. The dischargeable section 50 is a section between the start point 51 and the discharge position 26. The vehicle 13 stops and can discharge in this dischargeable section 50. The discharge position 26 is set in a position where the vehicle 13 can safely discharge the earth and sand loaded on the rear deck 13b outside the discharge site 21 without derailing and the like at the time when the rear wheel 13d of the vehicle 13 is positioned at the discharge position 26.

As shown in FIG. 10A, each of the segment points P1, P2, . . . is obtained by minutely segmenting the survey line 20 into plural points based on each of the positional data on the survey line 20.

Next, as shown in FIG. 10B, by obtaining each of the lines La1, La2, . . . normal to each of the segment points P1, P2, . . . , each of the points Q1, Q2, . . . on each of the normal lines La1, La2, . . . that is located in the prescribed distance d away from each of the segment points P1, P2, . . . in an inward of the discharge site 21 is obtained. Here, the distance d is a distance that sets the start point 51 of the dischargeable section 50. This distance d is set based on the radius of the rear wheel 13d of the vehicle 13 and the like (vehicle data).

Next, as shown in FIG. 10C, the line Lb' of which line shape is corrected is obtained by performing a smoothing process to the line Lb that is obtained by connecting each of the points Q1, Q2, . . . on each of the normal lines La1, La2, . . . . This smoothing process is performed through the filter process.

Each of the points on each of the lines Lb' obtained through the process mentioned above is the start point 51 of the dischargeable section 50.

Next, as shown in FIG. 11A, by minutely segmenting the line Lb' into plural points R1, R2, . . . and selecting segment points from each of the segment points R1, R2, . . . in every prescribed intervals, each of the selected segment points in every prescribed intervals is set to each of the start points 51 of the dischargeable section 50.

Next, as shown in FIG. 11A, segment points Rn, Rm both of which are located next to the start point 51 of the dischargeable section 50 along the line Lb are selected. The normal line Lc is a line normal to a line segment that is formed by connecting the segment points Rn, Rm. The direction of this normal line Lc is set to the reference approach direction 31 that the vehicle 31 approaches the discharge position 26.

Next, as shown FIG. 11A, based on the position of the start point 51 obtained through above-mentioned process, the direction 31 of the normal line Lc and the vehicle data, the position of the discharge position 26 is set at a position located on the normal line Lc and in the prescribed distance corresponding to a distance of the dischargeable section 50 starting from the start point 51. This calculation process is performed for each of the start points 51 on the line Lb'. As mentioned above, each of the discharge points 26 is obtained along the discharge range 20L, and each of the reference approach directions 31 at each of the discharge directions 26 is calculated. (step 103)

In the above-mentioned description, the calculation process for obtaining the discharge positions 26 and the reference approach directions 31 has been described only as one example. However, the present invention is not intended to be limited to this calculation process.

Figure 12:
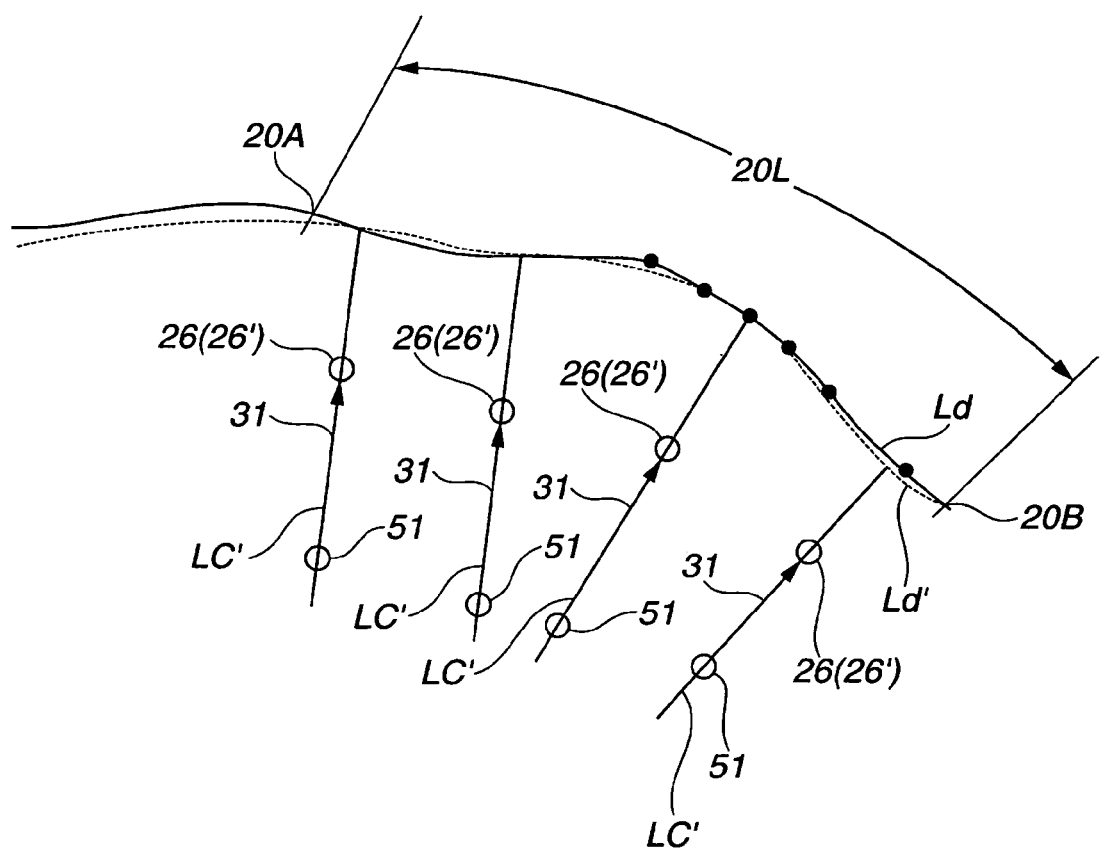
FIG. 12 is a diagram describing another generation method of the discharge positions and the reference approach direction.

For example, as shown in FIG. 12, by obtaining a line Ld' of which line shape is corrected through applying the smoothing process to a line Ld that is formed by connecting each of the measured positions on the survey line 20 so as to acquire a normal line Lc' that is normal to the line Ld' to which the smoothing process is applied, the discharge position 26 may be set on this normal line Lc', and the direction 31 of this normal Lc' may be set to the reference approach direction 31 for the reference to approach the discharge position 26. In this case, each of the discharge positions 26 is obtained for each of the normal lines Lc', each of the reference approach directions 31 for approaching each of the discharge positions 26, whereby each of the discharge positions 26 can be obtained along the discharge range 20L, and each of the reference approach directions 31 for approaching each of the discharge positions can be obtained.

Next, as shown in FIG. 11B, based on the data of the discharge position 26 and the reference approach direction 31 obtained in step 103, by setting the discharge position 26 as the target position (target discharge position) 26', data for a running course in which the vehicle 13 approaches this target discharge position 26' in the reference approach direction 31 in a reverse travel is generated. And the running courses 27 are generated for each of the target discharge positions 26'.

As mentioned above, based on each of the measured position data of the survey line 20 in the discharge site 21, the normal lines Lc (normal lines Lc' in a case of FIG. 12) to the survey line 20 are obtained. Based on this normal lines Lc (Lc'), the target discharge position 26' is set to a position located a prescribed distance away from the survey line 20 in an inward of the discharge site 21. And then, the data for the running courses 27 in which the reference approach direction 31 to approach the target discharge position 26' is normal to the survey line are generated (step 104).

Note that, even when the running courses 27 vary according to each of the target discharge positions 26', the running course data in the common running course region 14 in the running course 27 is common data. Therefore, each of the running courses 27 may be efficiently generated by producing only course data within the discharge site 21 and combining the produced course data with the common course data.

When the running courses 27 are generated as mentioned above, a process for guiding the vehicle to travel along the running course 27 is performed in the following steps 105 and 106. In this case, as shown in a loop 100A in FIG. 9, the running courses 27 may be generated every time the vehicle is guided to travel. Or, as shown in a loop 100B, after generating all the running courses 27 corresponding to each of the discharge positions 26 within the discharge range 20L (step 104), the vehicles 13 may be guided to travel along each of the running courses 27 one by one (steps 105 and 106).

As shown in the loop 100A in FIG. 9, in a case where the running course 27 is generated every time the vehicle 13 is guided to travel, in a configuration of FIG. 5, the running course generation section 5 in the monitor station 12 generates the next running course 2 to travel, and the positional data of the generated running course 27 are sent to the next vehicle 13 that is to travel. The vehicle 13 receives the sent positional data of the running course 27, and the positional data is stored in the running course storing section 11. In a case of the configuration of FIG. 4, the target position generation section 2 in the monitor station 12 obtains the next discharge position 26 for discharging the earth and sand, and the data of the reference approach direction to approach the discharge position 26 (step 103). And, the discharge position 26 and the data of the reference approach direction are sent to the next vehicle that is to travel, and the running course generation section 5 in the vehicle 13 generates the running course 27 that passes through the discharge position 26 based on the received discharge position 26 and data of the reference approach direction (step 104). And the positional data of the generated running course 27 are stored in the running course storing section 11.

As shown in the loop 100B in FIG. 9, in a case where, after all the running courses 27 corresponding to each of the discharge positions 26 within the discharge range 20L are generated, the vehicles 13 are guided to travel along each of the running courses 27 one by one, in a configuration of FIG. 5, the monitor station 12 selects the next running course 27 that is to be traveled from all the generated running courses 27, and the optional data of the selected running course 27 are sent to the next vehicle 13 that is to travel. In this vehicle 13, the positional data of the sent running course 13 are stored in the running course storing section 11.

As mentioned above, in a either case of the loop 100A, the loop 100B, the configuration of FIG. 5 or the configuration of FIG. 4, by sending the data regarding the running course 27 from the monitor station 12, the running course monitoring section 11 in the vehicle 13 stores the positional data of the running course 27 (step 105).

At the time of running, the positional data of the running course 27 stored in the running course storing section 11 are read out. The processing section 7 compares the current position of the vehicle measured by the position measuring section 8 with each of the position of the running course 27 read out from the running course storing section 11, and generates a running and a steering instructions in which the vehicle 13 follows each of the sequence of the positions on the running course 27. The running and the steering instructions are output to the running mechanism section 9 and the steering mechanism section 10, respectively. Consequently, as shown in FIGS. 3 and 11B, the vehicle 13 is guided to travel along the running course 27 and reaches the target discharge position 26' in the reference approach direction (reference discharge position) 31.

Specifically, the vehicle 13 starts to travel from the travel starting point, travels in a direction of arrow A on the common running course region 14, and reaches the entrance 21a of the discharge site 21. Passing through the entrance 21a, the vehicle enters into the discharge site 21. Then, the vehicle 13 performs a switchback movement in the discharge site 21. In other words, after advancing toward the arrow B direction, the vehicle 13 travels backward in a direction of arrow C. And, as shown in FIG. 8, an instruction to reduce the speed of and stop the vehicle 13 when the center of the rear wheel 13d of the vehicle 13 reaches the target discharge position 26' is output, and a speed of the vehicle is reduce to stop. After the vehicle 13 stops, the discharge operation is performed. In other words, the rear deck 13b of the dump truck 13 is tilted to discharge the earth and sand loaded in the rear deck 13b. However, even when the vehicle does not reach the target discharge position 26', the vehicle 13 may stop to perform the discharge operation if the vehicle is in the range of the dischargeable section 50.

The running mechanism section 9 controls the running of the vehicle 13 by adjusting the brake, engine revolution, and the like on the basis of the detected signal from the mound detection section 30.

As shown by the broken line 20C' in FIG. 8, the mound 20C' may be located before the target discharge position 26' and inside of the discharge site 21. In this case, if the center of the rear wheel 13d is moved to reach the calculated target discharge position 26', there is a possibility of detail and the like of the vehicle 13 because the position locates, in fact, outside of the survey line 20. Therefore, regarding the dischargeable section 50 as "a possible section where the mound 20C is actually located", the speed reduction instruction is output at the time of detecting the mound 20C to reduce and stop the vehicle 13 when the mound 20C is detected in this dischargeable section 50.

The detection signal of the mound detection section 30 is output, as an effective signal, to the running mechanism section 9 when the center position of the rear wheel 13d is located in the dischargeable section 50. When the rear wheel 13d reaches the mound 20C, a load is activated to the rear wheel 13d and the speed is reduced. When the detection signal that the speed of the vehicle 13 is reduced is input to the running mechanism section 9, the running mechanism section 9 outputs the speed reduction instruction to stop the vehicle 13, even before the speed reduction instruction to stop the vehicle 13 at the target discharge position 26' is output. Accordingly, the vehicle 13 stops at a position where the center of the rear wheel 13d is located before the target discharge position 26' without climbing over the mound 20C'. And then, the discharge operation is performed after the vehicle 13 stops. As a result, it is possible to safely and securely discharge the earth and sand outside of the survey line 20 without derailing and the like of the vehicle 13. Note that when the mound detection section 30 does not detect the mound 20C, in other words, when the speed or travel distance of the vehicle 13 is not reduced by the mound 20C, the running mechanism section 9 outputs the speed reduction instruction to stop the vehicle 13 at the target discharge position 26', and the vehicle 13 is stopped in a state that the center of the rear wheel 13d is matched with the target discharge position 26'.

Note that, when the center position of the rear wheel 13d is located outside of the dischargeable section 50 (before the dischargeable section 50), the detection signal from the mound detection section 30 is not input to the running mechanism section 9 as the effective signal. Thus, a situation that the vehicle 13 unnecessarily stops to discharge the earth and sand far before the survey line 20 by detecting the small gaps and the like on the ground in the discharge site 21 can be avoided.

After completing the discharge operation, the vehicle 13 advances in a direction of arrow D, leaves the discharge site 21 from the entrance 21a of the discharge site, and enters into the common running course region 14. Then, the vehicle 13 travels in a direction of arrow E on the common running course region 14, and reaches the travel ending point.

As mentioned above, according to the exemplary embodiment, the vehicle 13 can be safely guided to travel, and safely perform the discharge operation.

According to the exemplary embodiment, by automatic calculation process based on the data regarding each position on the survey line 20 measured through teaching, surveying and the like, plural target discharge positions 26' are obtained in the vicinity of and along the survey line 20, and the reference approach directions 31 normal to the survey line 20 are determined. Based on the calculation result, running courses 27 to approach the target discharge position 26' in the reference approach direction 31 are automatically generated, and vehicles 13 are guided to travel along the generated running courses 27 and discharge at the target discharge positions 26'. Thus, it is possible that the vehicle 13 approaches in the vicinity of the survey line with the reference discharge position 31, whereby discharging can be performed in the most efficient manner, and discharges the earth and sand outside the survey line 20 (or in the vicinity of the survey line 20) using the high-dump work in a secure and correct manner. As a result, almost all of the earth and sand can be discharged down to the precipice outside the survey line 20, the earth and sand that remains in the discharge site 21 can be reduced as minimum as possible. Consequently, leveling work can be efficiently performed by ordinary bulldozers 16, and the cost of efficient leveling work, vehicles and the like can be dramatically reduced.

Additionally, unlike the related arts, when generating the plural running courses 27, it is not necessary to differently perform teaching operation for the running courses 27 each of which has different target positions (discharge positions). Each of the running courses 27 is automatically generated after measuring each of the positions along the survey line 20 in the discharge range 20L. Therefore, time and cost for carrying work by the vehicle 13, preparation work (teaching or surveying) performed before the leveling work by the vehicle 16 can be reduced.

As mentioned above, according to the exemplary embodiment, leveling work at the discharge site 21 can be efficiently performed without raising the cost of vehicles, and the running courses 27 can be easily generated in a short time and at low cost.

Note that, in the exemplary embodiment, a description has been made by assuming the case where the vehicle 13 carries the earth and sand, and discharges them at the discharge site 21. However, the description is not intended to limit the load that the vehicle 13 carries and discharges to "the earth and sand", and the types of loads that the vehicle 13 carries and discharges are not limited to the earth and sand.

What is claimed is:

1. A control device for a guided travel of an unmanned vehicle, in which the unmanned vehicle is guided to travel along a running course so as to approach in a desired direction to a target discharge position as a target position where the unmanned vehicle performs a discharge operation at a discharge site, and is controlled to perform the discharge operation to discharge a load on the unmanned vehicle at the target discharge position, the control device comprising:

running course generation means for, after obtaining a line normal to the survey line based on each of measured position data of a survey line at the discharge site, generating, based on the obtained normal line, data of a running course in which the target discharge position is set at a position in a prescribed distance away from the survey line and a direction to approach the target discharge position is normal to the survey line; and control means for guiding the unmanned vehicle to travel along the generated running course to the target discharge position, and operating the unmanned vehicle so as to discharge the load on the unmanned vehicle at the target discharge position after the unmanned vehicle reaches the target discharge position.

2. The control device according to claim 1, wherein the running course generation means; obtains each segment point on the survey line based on the measured position data of the survey line, obtains each line normal to each of the segment points, obtains a point on each of the normal lines at a prescribed distance away from the segment points in an inward direction of the discharge site, obtains a line of which line shape is corrected by applying a smoothing process to a line that is acquired by connecting each of the obtained points on each of the normal lines, and by setting as the target discharge position a position on a line normal to the line to which this smoothing process is applied, generates the data of the running course in which the direction of the normal line is a direction to approach the target discharge position.

3. The control device according to claim 1, wherein the running course generation means;

obtains a line from which a survey line is corrected by applying a smoothing process to a line that is acquired by connecting each of the measured positions on the survey line, obtains a line normal to the line to which the smoothing process is applied, sets as the target discharge position a position on the normal line, and generates the data of the running course in which a direction of the normal line is a direction to approach the target discharge position.

4. The control device according to claim 1, wherein a mound is formed along the survey line at the discharge site, the unmanned vehicle is provided with a sensor for detecting that a wheel of the unmanned vehicle reaches a position at the mound formed along the survey line, and when the sensor detects that the wheel of the unmanned vehicle reaches the mound formed along the survey line before the wheel reaches the target discharge position, the unmanned vehicle is operated so as to discharge the load on the unmanned vehicle at the position where the sensor detects.

5. The control device according to claim 4, wherein the sensor detects a reduction of a speed or a travel distance of the unmanned vehicle, and when the reduction of the speed or the travel distance of the unmanned vehicle is detected by the sensor before a speed reduction instruction to stop the unmanned vehicle at the target discharge position is output, it is detected that the wheel of the unmanned vehicle reaches a position at the mound formed along the survey line, and the unmanned vehicle is operated so as to discharge the load on the unmanned vehicle at the position that the sensor detects.

6. A control method for a guided travel of an unmanned vehicle, in which the unmanned vehicle is guided to travel along a running course so as to approach in a desired direction to a target discharge position as a target position where the unmanned vehicle performs a discharge operation at a discharge site, and to perform the discharge operation to discharge a load on the unmanned vehicle at the target discharge position, the control method comprising:

measuring each position of a survey line showing a boundary line of the discharge site to obtain each of measured position data;

obtaining a line normal to the survey line based on each of the measured position data;

generating, based on the normal line, data of a running course in which the target discharge position is positioned at a prescribed distance away from the survey line and a direction to approach the target discharge position is normal to the survey line;

guiding the unmanned vehicle to travel along the generated running course to the target discharge position, and operating the unmanned vehicle so as to discharge the load on the unmanned vehicle at the target discharge position after the unmanned vehicle reaches the target discharge position.

7. The method of claim 6 further including the steps of:

obtaining each segment point on the survey line based on the measured position data of the survey line, obtaining each line normal to each of the segment points, obtaining a point on each of the normal lines at a prescribed distance away from the segment points in an inward direction of the discharge site, obtaining a line of which line shape is corrected by applying a smoothing process to a line that is acquired by connecting each of the obtained points on each of the normal lines, and by setting as the target discharge position a position no a line normal to the line to which this smoothing process is applied, generating the data of the running course in which the direction of the normal line is a direction to approach the target discharge position.

8. The method of claim 6 further including the steps of:

obtaining a line from which a survey line is corrected by applying a smoothing process to a line that is acquired by connecting each of the measured positions on the survey line, obtaining a line normal to each of the segment points, setting as the target discharge position a position on the normal line, and generating the data of the running course in which a direction of the normal line is a direction to approach the target discharge position.

9. The method of claim 6 further including the steps of:

forming a mound along the survey line at the discharge site, providing the unmanned vehicle with a sensor for detecting that a wheel of the unmanned vehicle reaches a position at the mound formed along the survey line, and when the sensor detects that the wheel of the unmanned vehicle reaches the position at the mound formed along the survey line before the wheel reaches the target discharge position, operating the unmanned vehicle so as to discharge the load on the unmanned vehicle at the position where the sensor detects.

10. The method of claim 9 further including the steps of:

detecting with the sensor, a reduction of a speed or a travel distance of the unmanned vehicle, and when the reduction of the speed or the travel distance of the unmanned vehicle is detected by the sensor before a speed reduction instruction to stop the unmanned vehicle at the target discharge position is output, detecting that the wheel of the unmanned vehicle reaches a position at the mound formed along the survey line, and operating the unmanned vehicle so as to discharge the load on the unmanned vehicle at the position that the sensor detects.

* * * * *